Oct. 26, 1954  K. KAHR  2,692,878
METHOD FOR THE CONTINUOUS PRODUCTION OF PURE LACTAMS
Filed July 10, 1951
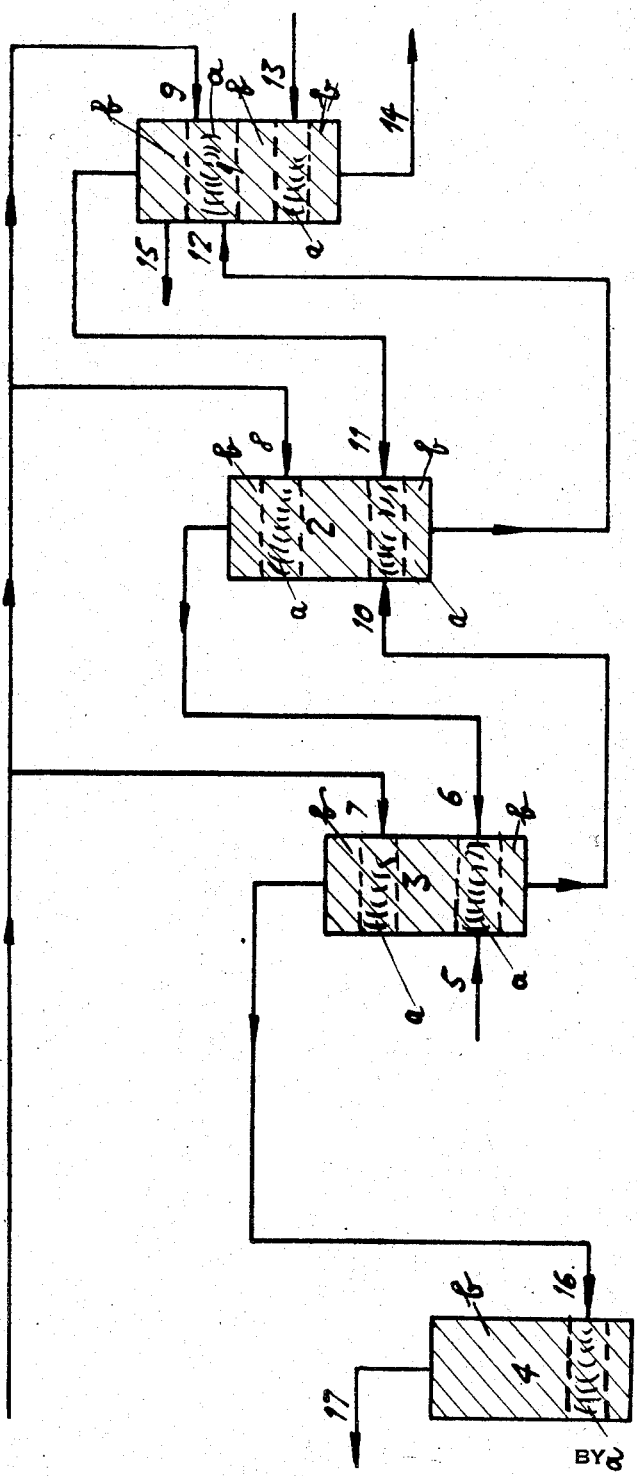
INVENTOR
Kurt Kahr
BY
Armand G. Martin
ATTORNEY Patented Oct. 26, 1954

2,692,878

UNITED STATES PATENT OFFICE 2,692,878

METHOD FOR THE CONTINUOUS PRODUCTION OF PURE LACTAMS

Kurt Kahr, Ems, Switzerland, assignor to Inventa A. G. fur Forschung und Patentverwertung, Zurich, Switzerland Application July 10, 1951, Serial No. 236,042

7 Claims. (Cl. 260—239.3)

This invention relates to a method for the continuous production of pure lactams and more particularly to a method for the extraction of pure lactams from raw lactams.

Lactams of the ω-aminocarbonic acids are used as starting material for the production of polyamides.

As known in the art, raw lactams are formed by Beckmann rearrangement of the corresponding cyclic oximes.

They are obtained by neutralization of the reaction mixtures of the Beckmann rearrangement with aqueous solutions of neutralizing agents.

The raw lactams, though water-soluble, are thereby separated and salted out of the concentrated salt solutions as lactam-oils which are almost free of salt and contain about 30 to 40% water.

In addition to the lactams also about 3 to 8% of by-products of basic as well as acid nature are formed in the Beckmann process. These are impurities which have to be removed from the lactams because due to these impurities the raw lactams are of a yellow to brown color.

The isolation of the lactams hitherto took place by extraction or distillation. To obtain completely colorless pure lactams, such as are used for the production of polyamides, it was heretofore definitely necessary that the isolated and pre-cleaned lactams be purified by at least one further distillation. Now, less losses occur in the extraction of the lactams from the raw lactams than in the distillation process. Due to the high temperature necessary in the latter process, decompositions are unavoidable even if the process is performed in a vacuum.

Only such solvents have been used heretofore for the extraction which dissolve more than 50% of the lactams at room temperature. Extraction means of this kind are in particular low boiling point chlorinated hydrocarbons, for instance chloroform, ethylenchloride, methylene chloride, and the like. In order to recover the lactams in maximum quantities from the raw lactams, alone or together with the concentrated salt solutions present in the mixture, it was absolutely necessary to use extraction means of high solubility. Hereby, the raw lactams dissolve completely in small quantities of the solvents whereby strongly colored and concentrated lactam solutions are obtained. Almost all of the water of the raw lactams separates as a diluted aqueous lactam solution. Together with the lactams the impurities dissolve in considerable proportions in the solvents which have to be used for the dissolution of the lactams. The resulting solutions are more or less strongly colored by the impurities and present after removal of the solvents lactams of yellow to brown color. As explained before, the removal of the impurities can only be performed by a distillation process in which complete removal of the impurities results in a considerable loss of yield because the impurities are almost of the same boiling points as the lactams.

In the purification by distillation, additions of acids or alkaline solutions in amounts up to 5% have proved advantageous for the quality of the lactams. Quality improvements were also achieved by treating the pre-purified lactams with oxidizing or reducing materials in these quantities as well as by treating with carbonic acid esters before the distillation of the lactams. By these additives, however, the yield of distillation is strongly reduced. The additives, which are added in excess, in relation to the quantity of the impurities, have a decomposing effect on the lactams at the high temperatures of distillation. A part of these decomposition products vaporizes with the lactams so that absolute purity of the lactams cannot be achieved. The major portion of the products of decomposition and the changed impurities remain behind in the distillation residue. The yields of pure lactams obtained in this manner from the pre-purified lactams amount to about 90%; referred to the raw lactams, the yields are even considerably lower.

If solvents with lower dissolving capacities for lactams are used for the extraction of the raw lactams, large quantities of solvent are required and dilute lactam solutions are obtained. It is uneconomical to extract the raw lactams with these solvents only, as, during the extraction, the water content of the raw lactams increases due to the removal of the lactams and the solubility of the lactams in the water, which is almost free of salt, is greater than in the extraction means.

If the raw lactams are extracted in a similar manner, together with the concentrated salt solutions present by their production, the raw lactams are dehydrated and salted out, whereby three layers are formed, i. e. lactam solvent, undissolved raw lactam, and salt solution. A continuous extraction, however, will become difficult in the presence of said three layers.

It is the object of this invention to overcome the disadvantages experienced heretofore, and to provide a new and effective process for the continuous production of pure lactam by extraction from raw lactams.

The inventor has found that colorless pure lactam in nearly quantitative yield may be obtained from the raw lactams by extraction in continuous process, if the lactams in diluted aqueous raw lactam solution satiated with neutral salts are subjected in a plurality of stages to a preliminary extraction with selective organic solvents according to the counterflow principle.

Thereupon, the already considerably purified lactam solutions are furthermore extracted with oxidizing or reducing acid or base binding aqueous solutions or they are adsorbed with solid materials possessing these qualities, whereafter the solvent is finally removed.

Suitable extractors usable according to the invention are such as have almost no solvent power for water, and which thus, at 20° C. dissolve less than 0.1% water. They should dissolve lactams not too well, i. e., at 20° C. not more than 30%. The boiling points of the extraction means must not exceed 100° C., as they are otherwise hard to separate from the lactams by distillation. They may consist of mixtures of several solvents, preferably of azeotropic boiling solvents.

A suitable mixture of this kind consists, for instance, of 55% benzole and 45% cyclohexane. This mixture boils at 77.5° C. (Lecat "Azeotropiame" 1918).

In the preliminary extraction, it is advantageous not to make the concentration of the lactam in the extraction means too high, preferably not over 15%, as below this lactam concentration but little water and small quantities of the impurities are taken up in proportion to the concentration of the lactam. By using about 4 to 10 times as much solvent as raw lactams, the lactam concentration mentioned can easily be maintained. It is more advantageous to employ a solvent or azeotrope boiling mixture, in which the lactam concentration during extraction cannot rise about 15%. Thus, for instance, $\epsilon$-caprolactam in the azeotrope of benzole and cyclohexane has, at 20° C., a concentration of about 12% in the extraction means. By using higher or lower temperatures in the preliminary extraction the lactam concentration in the extraction means increases or decreases. The adjustment of a definite lactam concentration may thus be corrected via the temperature within a certain range.

The advantage of solvents with lower dissolving power for lactams in the preliminary extraction is that only slight quantities of impurities get into the solution. After the preliminary extraction, the impurities, in particular the dyes, which otherwise dissolve in the solvents which dissolve lactams well, separate out as flakes in the separating layer. The lactam solutions resulting from the preliminary extraction contain only slight impurities and are therefore hardly colored. According to the present invention, the lactams are subjected to preliminary extraction out of dilute, aqueous, raw lactam solution, saturated with neutral salts. The adjustment of the salt concentration is done by adding concentrated salt solution as obtained in the production of the raw lactams. The water for dilution originates from the extracted raw lactam solutions, the saturation concentrations for the salts being high with low lactam concentration and low with high lactam concentration. Thus, the saturation concentration, for instance for ammonium sulphate with concentrated, raw $\epsilon$-caprolactam with abt. 66% lactam content, is around 1%, and with dilute raw caprolactam with 33% lactam content, about 8%, and finally, with the excessively diluted raw lactam with a 1.5% caprolactam content, around 30% ammonium sulphate. If concentrated salt solution is added to a dilute raw lactam solution which is not yet saturated with salt, the lactam solution absorbs salt to the saturation point, the remaining salt solution separating from the dilute raw lactam solution.

When a dilute, aqueous raw lactam solution saturated with salt is extracted, one obtains a lactam concentration in the extraction means which is equally as high as when extracting concentrated salt saturated raw lactam solutions.

The advantage of the extraction method described is that, when maintaining salt saturation in the dilute raw lactam solution, no intermediary layer of concentrated raw lactam separates out which would complicate the continuous preliminary extraction and even make impossible the use of tower extraction. The preliminary extraction is advantageously carried out in counterflow in such a manner that fresh raw lactam solution, which, in the first extraction stage is diluted to a certain concentration and extracted with a solvent enriched with lactam, is directed in the following extraction stages, under continuous dilution of the raw lactam solution, toward a solvent with lower lactam content. At the end of the preliminary extraction, fresh extraction means flows counter to an almost lactam-free, aqueous salt solution. In the individual preliminary extraction stages, the current is in the main determined by the quantity of the solvent, which amounts to more than four times the volume of the raw lactams. When using an extraction means which has a lower specific gravity than the most dilute raw lactam solutions, the main current in the extraction stages therefore goes from the bottom toward the top. The raw lactams are therefor advantageously introduced in the lower part of the preliminary extraction stages and carried upward by the current, whereby they are extracted. The concentrated salt solutions flowing into the preliminary extraction stages to maintain salt saturation are added to the upper part and fall downward due to its higher specific gravity. As the partly extracted raw lactam solutions rise to the top in the preliminary extraction stages, the salt solution flowing in the opposite direction effects constant saturation. In the last, preliminary extraction stage, which contains little lactam, the addition of salt solution for saturation is considerable, so that its downward flow has an influence. In this stage dilute raw lactam solutions are advantageously introduced in the upper or middle part of the preliminary extraction stage.

A great advantage of the preliminary extraction process described is the considerably facilitated separation of impurities. The solubility of the impurities is greater in the raw lactams than in the salt solution, into which they are, for the most part, to enter in the course of the extraction. On the one hand, this is facilitated by the fact that the impurities are taken up by the aqueous solution very gradually. Furthermore, according to the process as invented, the pre-extracted lactam solution is drawn off at the point where the lactam-richest aqueous raw lactam solution is located. In this manner, the impurities are, to a large extent, retained in the aqueous raw lactam solution. A part of the impurities separates out in the form of flakes where the raw lactam solution has the least lactam and may be removed from the separating layer by drawing off. The lactam solutions obtained after this preliminary extraction contain considerably less impurities than the lactam solutions obtained according to the extraction processes used hitherto. These slight impurities must, however, be removed if the lactams are to be further processed into polyamides.

According to the invention, this is achieved by a subsequent extraction with an aqueous solution or by adsorption to anion exchangers in the presence of water.

In this manner colorless lactam solutions are obtained, which, after removal of the solvent, for instance by vacuum distillation, result in completely colorless, unchanging pure lactams.

As aqueous solutions for secondary extraction, aqueous solutions of oxidizing materials in minimum concentration may be used. Effective as oxidation means are, for instance, already an $n/500$ potassium permanganate solution and/or a 0.05% hydrogen peroxide solution, whereby the affected impurities remain in the aqueous solution. But also alkali solutions as, for instance, weak solutions of soda lye, sodium carbonate, or calcium hydroxide greatly contribute, in the secondary extraction, to the removal of the last traces of impurities by binding the impurities. Advantageously, solutions with a pH value between 7 and 12 are employed.

The aqueous solutions serving for secondary extraction contain more or less lactam, according to the lactam concentration in the extraction means. For instance, the lactam concentration in the aqueous solution amounts to about 60% when 12% $\epsilon$-caprolactam is present in the azeotrope benzole cyclohexane.

The secondary extraction may be carried out with oxidizing solutions in an alkaline medium. It may be conducted in one or more stages. If, for instance, two stages are used, the two stages may be conducted either only in oxidizing or alkaline solutions, or in a combination of these solutions.

The surprising cleansing effect of the aqueous solutions with such slight concentration of additives is only possible because the preliminary extraction removes the impurities from the lactam solutions with the exception of a slight residue. The aqueous solutions used for secondary extraction, for instance in the tower extraction process, must be continuously replenished. Hereby, a replacement will be sufficient of, for instance, 1% by volume of a lactam-free, aqueous solution of the additives, referred to a 12% pre-extracted caprolactam solution. (In the hitherto practiced purification of the lactams by distillation, 100 to 1,000 times the quantity of additives is required.)

To obtain completely pure lactams, it is necessary to use only extremely dilute solutions as otherwise the lactam solutions with their even small water content would carry along the dissolved materials, so that they increase in concentration in the lactams.

Advantageously, only such materials are used in the secondary extraction which are not dissolved out by the lactam solutions and which do not chemically alter the lactams. Purely inorganic substances are particularly suited for this purpose. The secondary extraction is advantageously carried out at room temperature, directly after the preliminary extraction and is also carried out as a continuous process. The aqueous extraction solutions used up in the secondary extraction may, without difficulty, be returned continuously to the preliminary extraction as raw-lactams.

Ion exchangers may also be used as adsorption means.

The secondary purification by adsorption may be carried out in one or more stages with the same or different substances, if desired in combination with secondary extraction by means of aqueous solutions.

In the accompanying drawing a diagram shows schematically how to carry out a preferred embodiment of the invention, i. e. the continuous extraction of the raw lactams in a three-stage preliminary extraction and a single stage secondary extraction.

The preliminary extraction plant is represented by the towers 1, 2, and 3; the secondary extraction is performed in tower 4.

The towers are arranged in steps, one below the other, in order that the solvent can run through all the towers by gravity. Each tower has several stirring zones, $a$, $a$, bounded by perforated plates which are separated from each other by a quieting zone $b$. The top and bottom parts of the extraction towers are also quieting zones $b$, $b$. The separating layers of extraction means and lactam solutions are maintained in the upper part of the towers. The raw lactam enters the lowest stirring zone of tower 3 at 5. Into the same stirring zone, lactam-enriched solvent from tower 2 flows at 6. At 7, 8, and 9 various quantities of concentrated salt solutions flow into the top stirring zones of the preliminary extraction towers to adjust the saturation concentration. From tower 3 the solvent richest in lactam overflows into the secondary extraction tower 4.

The diluted raw lactam solution, rich in lactam, is drawn off at the bottom of tower 3 and is introduced at 10 into the bottom stirring zone of tower 2. Into the same stirring zone of tower 2, a solvent with a low lactam content enters at 11 from tower 1 and leaves tower 2 at the top enriched in lactam. From the bottom of tower 2, a low lactam content salt solution flows off to one of the top or middle stirring zones of tower 1 at 12. Fresh solvent enters the bottom stirring zone of tower 1 at 13 and overflows from the top of tower 1 with little dissolved lactam. Fully extracted, concentrated, lactam-free salt solution flows from the bottom of tower 1 at 14, containing the impurities in soultion. The flaky impurities separating out are continuously drawn off at 15.

In the secondary extraction tower 4, the pre-extracted lactam solution enters at 16. The last impurities are extracted in this tower by means of aqueous solutions of additives with lactam content. Finally, the entirely pure, colorless lactam solution flows off at 17 and is freed of solvent by evaporation.

The lactams which remain are completely colorless, unaffected by light or air, and of great purity. The extraction yields amount to more than 98% referred to the lactams contained in the raw lactams.

The parts mentioned in the following examples are parts by volume.

*Example 1*

500 parts of raw $\epsilon$-caprolactam oil flow hourly at 15° C. into an extraction plant, as shown in the drawing and described above. In counterflow 2500 parts of a solvent mixture of 55% benzole and 45% cyclohexane are put through the preliminary extraction equipment hourly at the same temperature. 115 parts of a 40% ammonium sulphate solution enter the third tower, 345 parts of this ammonium sulphate solution enter the second tower and 690 parts of the same enter the first tower hourly at 15° C. Hourly about 1300 parts of lactam-free concentrated ammonium sulphate solution, with a dark coloration due to the dissolved impurities, are drawn off from the preliminary extraction equipment. Into the secondary extraction about 2800 parts of almost colorless ca. 13% ε-caprolactam flow hourly from the preliminary extraction together with 28 parts of an 0.2 aqueous solution of barium peroxide. From the secondary extraction tower the lactam solution goes into a vacuum distillation plant. After the evaporation of the solvent, there remains a completely colorless, pure ε-caprolactam with a yield of 99% referred to the lactam contained in the raw lactam.

Example 2

Into the extraction plant described above and shown in the drawing, 500 parts of raw ζ-enantholactam oil and 2500 parts of a mixture of 55% benzole and 45% cyclohexane flow hourly at 35° C. Into the third tower flow 155 parts of a ca. 30% sodium sulphate solution, into the second tower 465 parts of this sodium sulphate solution, and into the first tower 930 parts of the same, all hourly and at 35° C. From the preliminary extraction plant abt. 1700 parts of a concentrated sodium sulphate solution are drawn off hourly at 35° C. Into the secondary extraction tower there flow hourly at 20° C. about 2850 parts of an almost colorless 14% ζ-enantholactam solution and 30 parts of an $n/100$ soda lye which contains 0.5% sodium hydrosulfite in solution. After evaporation of the solvent a pure white ζ-enantholactam is obtained, the yield being 98.5%.

Example 3

500 parts of raw ε-caprolactam are preliminarily extracted in the manner indicated in Example 1. Into the first tower of a two-tower secondary extraction plant 2800 parts of a 13% ε-caprolactam solution and 28 parts of a cold saturated filtered calcium hydroxide solution containing 0.2% hydrogen peroxide flow hourly. The lactam solution then flows into the second tower where likewise 10 parts of a similar calcium hydroxide solution flow in hourly. After elimination of the solvent there is obtained a snow-white light and air-proof caprolactam, the yield being 99%.

Example 4

500 parts of raw ε-caprolactam are extracted in the preliminary and secondary extraction plant described in Example 3. Into the second tower of a secondary extraction plant, however, 14 parts of a saturated aqueous calcium sulfite solution are added hourly. After the elimination of the solvent, ε-caprolactam is obtained in the same quality and yield.

Example 5

500 parts of raw ε-caprolactam are pre-extracted as in Example 1. Into the first tower of the two-stage secondary extraction, 25 parts of a solution, which is $n/50$ with reference to sulfuric acid and $n/250$ with reference to potassium permanganate, flow hourly. Into the second tower, 10 parts of a saturated, aqueous calcium hydroxide solution, flow hourly. After passing through these two stages, the lactam solution is evaporated and gives a perfect ε-caprolactam, the yield being 98.5%.

Example 6

500 parts of raw ε-caprolactam are pre-extracted as in Example 1. The secondary extraction plant consists of two towers, of which the first is filled with 200 parts of synthetic resin cation exchanger and the second with 200 parts of synthetic resin anion exchanger. The lactam solution, having passed through these towers, gives, after elimination of the solvent, a pure perfect ε-caprolactam, the yield being 98%.

While I have described preferred embodiments of my invention, it will be understood that I do not limit myself in any particular.

Obviously, various modifications of my extraction process may be made within the scope of the following claims.

I claim:
1. The process for continuous production of pure lactams from raw lactams obtained by the Beckmann rearrangement of cyclic oximes, which comprises saturating diluted aqueous raw lactam solutions with neutral salts, subjecting said saturated solutions to a preliminary extraction with unsubstituted hydrocarbon solvents boiling below 100° C. and dissolving at 20° C. not more than 0.1% water and up to 30% of lactams, in a plurality of stages on the counterflow principle, subjecting the resulting considerably purified solutions of the lactams to a second purifying treatment with inorganic acid-binding substances in the presence of water at a pH from 7–12 in at least one stage and subsequently eliminating the solvent.

2. The process set forth in claim 1, wherein benzene is used in mixture with saturated hydrocarbon solvents.

3. The process set forth in claim 1, wherein an azeotropic boiling solvent mixture of benzene-cyclohexane is used in the preliminary extraction.

4. The process set forth in claim 1, wherein more than four times the volume of the organic solvents is used compared to the volume of raw lactams.

5. The process set forth in claim 1, wherein in the preliminary extraction the concentracted neutral salt solution obtained in the production of the raw lactams is used to achieve salt saturation.

6. The process set forth in claim 1, wherein the concentrated salt solution used for saturation is introduced in counterflow to the dilute raw lactam solution and to the lactam-containing solvent.

7. The process set forth in claim 1, wherein the subsequent purification of the solution resulting from the first extraction is performed with addition of peroxide compounds.

References Cited in the file of this patent

UNITED STATES PATENTS

| Number | Name | Date |
|---|---|---|
| 2,221,369 | Cass | Nov. 12, 1940 |
| 2,234,566 | Lozier et al. | Mar. 11, 1941 |
| 2,313,026 | Schlack | Mar. 2, 1943 |
| 2,341,907 | Cheetham et al. | Feb. 15, 1944 |
| 2,423,200 | Moncrieff et al. | July 1, 1947 |
| 2,462,008 | Snider et al. | Feb. 15, 1949 |
| 2,462,009 | Morris et al. | Feb. 15, 1949 |

FOREIGN PATENTS

| Number | Country | Date |
|---|---|---|
| 896,883 | France | Mar. 6, 1945 |